United States Patent
Cai et al.

(10) Patent No.: US 9,838,950 B2
(45) Date of Patent: Dec. 5, 2017

(54) SYSTEM AND METHOD OF ANQP QUERYING USING A COMMON ANQP GROUP VERSION

(71) Applicant: FutureWei Technologies, Inc., Plano, TX (US)

(72) Inventors: Lin Cai, Hoffman Estates, IL (US); George Calcev, Hoffman Estates, IL (US); Xingxin Zhang, Chengdu (CN)

(73) Assignee: Futurewei Technologies, Inc., Plano, TX (US)

( * ) Notice: Subject to any disclaimer, the term of this patent is extended or adjusted under 35 U.S.C. 154(b) by 80 days.

(21) Appl. No.: 14/267,656

(22) Filed: May 1, 2014

(65) Prior Publication Data

US 2014/0341072 A1 Nov. 20, 2014

Related U.S. Application Data

(60) Provisional application No. 61/823,309, filed on May 14, 2013.

(51) Int. Cl.
*H04L 12/28* (2006.01)
*H04W 48/14* (2009.01)
*H04W 48/16* (2009.01)

(52) U.S. Cl.
CPC .......... *H04W 48/14* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 9,635,555 B2* | 4/2017 | Gupta | H04W 12/08 |
| 2013/0070738 A1 | 3/2013 | McCann et al. | |
| 2013/0121325 A1* | 5/2013 | McCann | H04W 48/12 370/338 |
| 2013/0176897 A1 | 7/2013 | Wang et al. | |
| 2013/0272289 A1 | 10/2013 | Yao et al. | |

(Continued)

FOREIGN PATENT DOCUMENTS

| | | |
|---|---|---|
| CN | 103002544 A | 3/2013 |
| JP | 2015508614 A | 3/2015 |

(Continued)

OTHER PUBLICATIONS

International Search Report and Written Opinion received in Application No. PCT/CN2014/077462, dated Jul. 17, 2014, 11 pages.

(Continued)

*Primary Examiner* — Chi H Pham
*Assistant Examiner* — Fahmida Chowdhury
(74) *Attorney, Agent, or Firm* — Slater Matsil, LLP

(57) ABSTRACT

A system and method of ANQP querying using a common ANQP group version. One embodiment of the method includes associating an original common ANQP group version with a common ANQP group, transmitting a message containing the original common ANQP group version to at least one station, associating a new common ANQP group version with the common ANQP group when an element therein is changed, and transmitting another message containing the new common ANQP group version to the at least one station.

34 Claims, 6 Drawing Sheets

(56) References Cited

U.S. PATENT DOCUMENTS

| | | | |
|---|---|---|---|
| 2014/0018037 A1* | 1/2014 | Shanmugavadivel | H04W 48/18 455/411 |
| 2014/0119353 A1* | 5/2014 | McCann ............ | H04W 76/022 370/338 |
| 2014/0171078 A1* | 6/2014 | Ryerson ............... | H04W 48/18 455/435.2 |
| 2014/0204872 A1 | 7/2014 | Yang et al. | |
| 2016/0080958 A1* | 3/2016 | Rinne .................. | H04W 24/10 370/338 |

FOREIGN PATENT DOCUMENTS

| | | |
|---|---|---|
| WO | 2012061504 A2 | 5/2012 |
| WO | 2013063942 A1 | 5/2013 |

OTHER PUBLICATIONS

"Draft Standard for Information Technology—Telecommunications and information exchange between systems—Local and metropolitan area networks—Specific requirements," Part 11: Wireless LAN Medium Access Control (MAC) and Physical Layer (PHY) Specifications, Amendment 7: Fast Initial Link Setup, IEEE P802.11ai/D1.1, Sep. 2013, 126 pages.

Barber, P., et al., "GAS Version Control in 11ai", doc.: IEEE 802.11-11/1498-01-00ai, Oct. 24, 2011, 16 pages.

\* cited by examiner

SYSTEM AND METHOD OF ANQP QUERYING USING A COMMON ANQP GROUP VERSION

This application claims the benefit of U.S. Provisional Application No. 61/823,309, filed on May 14, 2013 by Cai, et al., entitled "System and Method to Reduce ANQP Query with ANQP Configuration Sequence Number," which application is hereby incorporated herein by reference.

TECHNICAL FIELD

The present disclosure relates generally to a system and method for access network query protocol (ANQP) querying and, in particular embodiments, to a system and method for versioning a common ANQP group.

BACKGROUND

Wi-Fi systems are generally made up of multiple stations, which are any devices capable of communication over Wi-Fi, for example, using the IEEE 802.11 protocol. A station can be a variety of devices, including personal computers (PCs), mobile phones, smart phones, tablet computers, personal digital assistants (PDAs), and access points (APs). An AP is a station that allows other stations to connect to a network using Wi-Fi. One AP and at least one other station can form a basic service set (BSS). The BSS is identified by a basic service set identifier (BSSID), which is a unique identifier for naming wireless networks. Multiple BSS APs can form an extended service set (ESS). An ESS is a set of two or more interconnected wireless BSSs that share a service set identifier (SSID) or a homogeneous ESS identifier (HESSID). SSID is a human-readable network name and HESSID is used by a collection of homogeneous BSSs. The HESSID includes a MAC address of one of the APs from that ESS. ESSs are common in corporate networks and certain public access networks where a single AP cannot necessarily provide sufficient access to the network. An ESS typically belongs to a single operator.

SUMMARY OF THE INVENTION

Embodiments of the present invention provide a method and system for carrying out ANQP querying using a common ANQP group version to version a common ANQP group.

An embodiment method of versioning a common ANQP group includes associating an original common ANQP group version with a common ANQP group, transmitting a message containing the original common ANQP group version to at least one station, associating a new common ANQP group version with the common ANQP group when an element therein is changed, and transmitting another message containing the new common ANQP group version to the at least one station.

An embodiment method of ANQP querying includes receiving a message containing a first common ANQP group version associated with a current common ANQP group, receiving another message containing a second common ANQP group version, and transmitting an ANQP query to an ANQP server when the first common ANQP group version and the second common ANQP group version differ.

An embodiment ANQP server includes a memory configured to store a common ANQP group according to a common ANQP group data structure having a plurality of ANQP attributes, a network interface configured to transmit the common ANQP group and a common ANQP group version associated therewith to at least one station, a processor configured to cause an updated value to be stored in one of the plurality of ANQP configuration elements, and a new common ANQP group version to be transmitted to the at least one station.

An embodiment station includes a memory configured to store a common ANQP group according to a common ANQP group data structure and a common ANQP group version associated with the common ANQP group, a network interface operable to gain access to and employ the common ANQP group for carrying out wireless communication, and receive another common ANQP group version, and a processor configured to gain access to and compare the common ANQP group version to the another common ANQP group version, and cause the network interface to transmit an ANQP query message to an ANQP server when the common ANQP group version and the another common ANQP group version differ.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
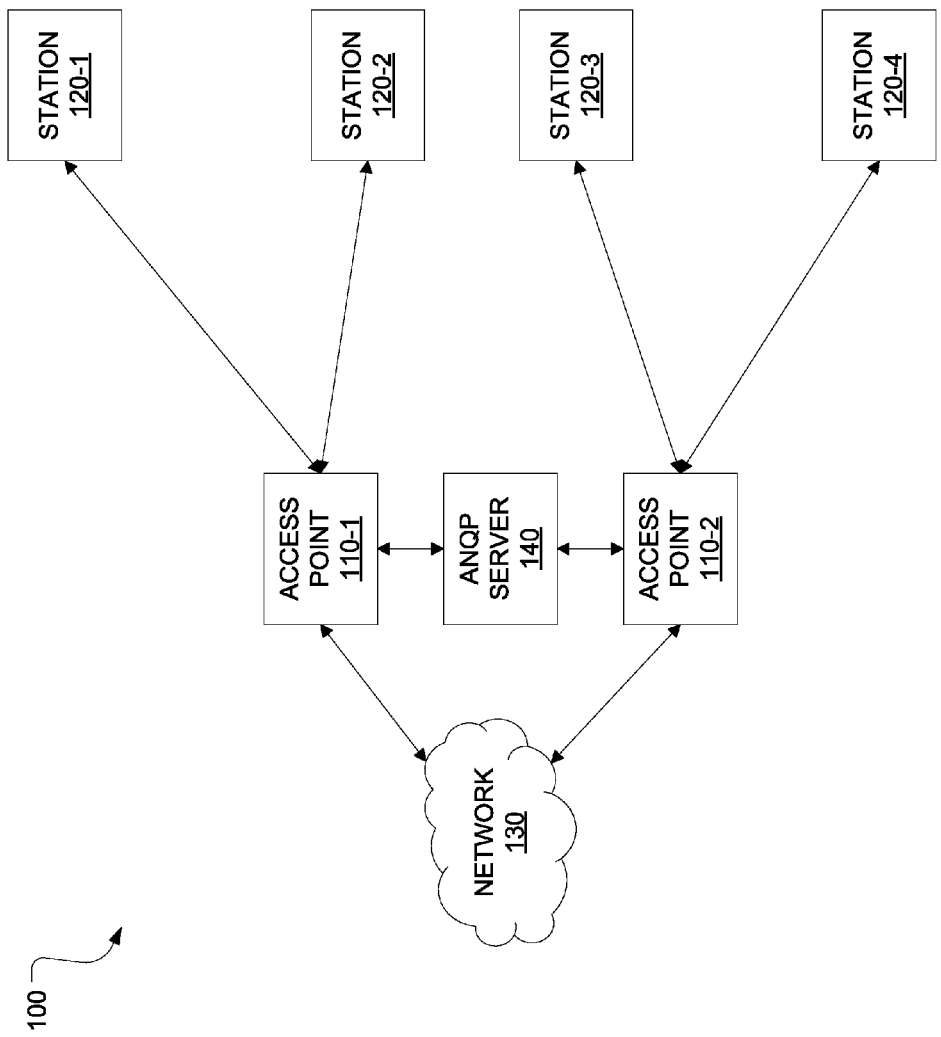
FIG. 1 is a block diagram of one embodiment of a Wi-Fi system.

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

A station gains access to the network through an AP. When multiple Wi-Fi networks are co-located, a station collects information from multiple networks to select and connect to the best available network. The station discovers this information through the use of ANQP, which is a query and response protocol used by mobile devices to gather network specific attributes. Network attributes can include, for example, domain name, credential types, extensible authentication protocol (EAP) method, internet protocol (IP) type (IPv4 or IPv6), and other information.

The network attributes to be used in a given implementation are referred to as a common ANQP group that represents a collection of ANQP attributes, or ANQP elements, whose values are shared among an AP and its neighbors. It is realized herein stations often do not need the values of all ANQP attributes to select a network. It is further realized herein the common ANQP group corresponds to the minimal set of ANQP attributes used by a station to select among multiple Wi-Fi networks. The common ANQP group and its ANQP attributes are managed by an ANQP server.

The ANQP server stores the ANQP attributes. The common ANQP group can be represented as a set of ANQP attribute IDs and associated values.

A station uses a generic advertisement protocol (GAS) to send an ANQP query to the ANQP server via the AP. When an AP receives a GAS request frame transporting an ANQP request, it extracts the ANQP request and forwards it to the ANQP server. The ANQP server receives the ANQP request, generates an ANQP response and sends it back to the AP, which takes the ANQP response and embeds it into a GAS response that is sent back to the station. Stations use this ANQP protocol before and after association with an AP to gather Wi-Fi networks' attribute values used for network selection and re-selection. The ANQP attributes in a given common ANQP group do occasionally change, making it necessary for stations to submit occasional ANQP queries to ensure their common ANQP group is current.

Additionally, a station can move from one BSS to another, transitioning from network access through one AP to access through another. In an ESS, the APs in each of the BSSs often share ANQP attributes, but not necessarily. When the station moves from one BSS to another, or revisits the same BSS after some time away, it typically transmits an ANQP query to discover if the new BSS has the same common ANQP group as the prior BSS and that the values of the ANQP attributes did not change. If this is the case, the station does not query for each ANQP attribute value, rather it uses the values stored in the local cache to make its network selection. For example, in generic advertisement service (GAS) systems, where an AP provides access to an advertisement server, stations frequently move in and out of the BSS or ESS for that GAS system.

It is realized herein that rather than periodically transmitting ANQP queries, a station can use a common ANQP group version to determine when an ANQP query is necessary for maintaining current ANQP attributes. A common ANQP group version is a string of one or more values that identify a version of a common ANQP group. The common ANQP group version is associated with a certain version of the common ANQP group, and is incremented when one or more ANQP attributes within the common ANQP group are updated or the group composition itself is changed. It is further realized herein the common ANQP group version should be transmitted to the various stations desiring network access through a given AP. The common ANQP group version can be included in an independent message in response to a probe. Alternatively, it is realized herein, the common ANQP group version can be included in management frames, such as periodic beacon messages from the AP. It is also realized herein the common ANQP group version can be included in an ANQP response to the ANQP query.

It is realized herein the stations receiving the common ANQP group version can compare the common ANQP group version to a previous common ANQP group version associated with the current common ANQP group. If the new and previous common ANQP group versions match, the station can continue using the current common ANQP group to carry out wireless communication through the AP. If the new and previous common ANQP group versions are distinct, or differ, the station can generate and transmit an ANQP query to discover the new common ANQP group attribute IDs and their values. When the new common ANQP group attributes are received in an ANQP response message, the station can use the new common ANQP group attributes to carry out further wireless communication through the AP.

FIG. 1 is a block diagram of one embodiment of a Wi-Fi system 100 within which the AP or station introduced herein may be embodied, or the method of versioning a common ANQP group or ANQP querying may be carried out. Wi-Fi system 100 includes an access point 110-1, an access point 110-2, an ANQP server 140, and stations 120-1, 120-2, 120-3, and 120-4. Access points 110-1 and 110-2 are stations that provide wireless access to a network 130. Station 120-1 and station 120-2 are associated with access point 110-1 and gain access to network 130 through access point 110-1. Likewise, station 120-3 and station 120-4 are associated with access point 110-2 and gain access to network 130 through access point 110-2.

Access point 110-1 together with station 120-1 and station 120-2 can form a BSS having a BSSID. Access point 110-2 together with station 120-3 and station 120-4 can form another BSS having another BSSID or sharing the HESSID or SSID of the first BSS. If the two BSSs are joined in an ESS, they likely share the HESSID and SSID. Access point 110-1 and access point 110-2 require their respective associated stations to use certain ANQP attributes to gain access to network 130. ANQP attributes are managed by ANQP server 140 as a plurality of ANQP attributes. ANQP attributes are individually scoped, meaning they apply to the BSS or the ESS. In certain embodiments, separate common ANQP groups are maintained for each BSS, allowing variance among BSSs in certain ANQP attributes. ANQP server 140 distributes a common ANQP group to access point 110-1 and access point 110-2. Stations 120-1, 120-2, 120-3, and 120-4 can discover the ANQP attributes by transmitting an ANQP query to their respective access point. Access point 110-1 and access point 110-2 pass the ANQP query along to ANQP server 140. ANQP server 140 responds to the query with the common ANQP group through access point 110-1 and access point 110-2, which relay the common ANQP group to stations 120-1, 120-2, 120-3, and 120-4.

Access point 110-1 and access point 110-2 can use the same ANQP attributes, which is common in systems having a unified security or administrative scheme. Access point 110-1 and access point 110-2 respond to ANQP queries with a common ANQP group that describes the ANQP attributes.

ANQP server 140 manages common ANQP groups for access point 110-1 and access point 110-2. A given common ANQP group is associated with a common ANQP group version that effectively versions the common ANQP group. When ANQP server 140 updates one or more ANQP attributes in the common ANQP group, ANQP server 140 associates the new common ANQP group with a new common ANQP group version. Both the common ANQP group and the associated common ANQP group version are transmitted to stations 120-1, 120-2, 120-3, and 120-4 through access point 110-1 and access point 110-2. When station 120-1, station 120-2, station 120-3, or station 120-4 recognize the new common ANQP group version is distinct from the current common ANQP group version held by a particular station, that station can generate an ANQP query to discover the new common ANQP group.

Rather than stations 120-1, 120-2, 120-3, and 120-4 transmitting ANQP queries that consume station, access point, and network resources, stations 120-1, 120-2, 120-3, and 120-4 transmitting ANQP queries as-needed conserves these resources.

Having described a Wi-Fi system within which the AP, station, and methods of versioning a common ANQP group and ANQP querying introduced herein may be embodied or carried out, several embodiments of the AP, station, and methods will be described.

Figure 2:
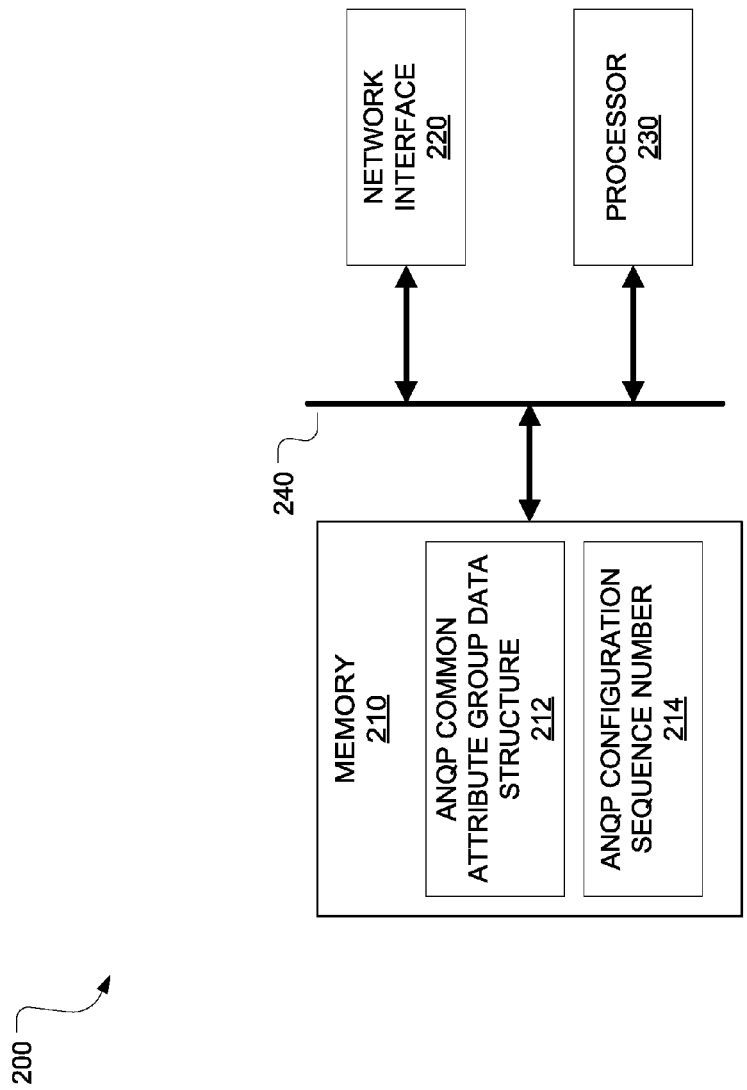
FIG. 2 is a block diagram of one embodiment of a station.

FIG. 2 is a block diagram of one embodiment of a station 200. Station 200 includes a memory 210, a network interface 220, and a processor 230, all coupled by a data bus 240. Data bus 240 can be any electrical interface over which processor 230 and network interface 220 can gain access to memory 210 and communicate between each other. For example, in certain embodiments, data bus 240 is one or more cables connecting memory 210, network interface 220, and processor 230. Data bus 240 can be a parallel bus, such as peripheral component interconnect (PCI) and small computer system interface (SCSI), among others. In other embodiments, data bus 240 is a serial bus, such as serial advanced technology attachment (SATA) and universal serial bus (USB), among others.

Network interface 220 is responsible for transmitting and receiving data over one or more wireless communication channels. Network interface 220 operates according to a protocol for a given wireless communication channel. For example, in a Wi-Fi system, network interface 220 is configured to carry out wireless communication according to IEEE 802.11. Network interface 220 receives instructions from processor 230 over data bus 240. Processor 230 is operable to execute an application, thereby generating instructions for network interface 220 and other subsystems on station 200.

Memory 210 is an electronic storage device configured to store a common ANQP group data structure 212 and a common ANQP group version 214. Memory 210 can be a variety of memory types, including flash memory, random access memory, and others. Data is written to and read from memory 210 through data bus 240. Common ANQP group data structure 212 contains one or more ANQP attributes that, together, compose ANQP attributes necessary for wireless communication through network interface 220. ANQP attributes that can be included in common ANQP group data structure 212 include a domain name, IP address type availability, network authentication type, $3^{rd}$ generation partnership project (3GPP) cellular network, and other pieces of data.

In certain embodiments, station 200 is an AP and processor 230 is configured to execute an AP application that allows station 200 to provide network access to other associated stations. Common ANQP group version 214 is associated with a common ANQP group received from an ANQP server and stored, or cached, in common ANQP group data structure. In alternative embodiments, the common ANQP group is not stored locally on the AP. Instead, station 200 relies on an ANQP server to provide the common ANQP group. Continuing the embodiment of FIG. 2, processor 230 is configured to cause the common ANQP group to be transmitted to one or more stations through network interface 220. Common ANQP group version 214 is also transmitted to the one or more stations and can be included in the message containing the common ANQP group, or can be included in another independent message. When an update is made to one or more of the ANQP attributes in the common ANQP group data structure, a new common ANQP group version is received from the ANQP server and is cached in memory 210. The new common ANQP group version is distinct from common ANQP group version 214. In certain embodiments, the new common ANQP group version is simply an increment larger than common ANQP group version 214. Processor 230 also causes the new common ANQP group version to be transmitted to the one or more stations through network interface 220.

When an ANQP query is received over network interface 220, processor 230 generates an instruction for the ANQP query to be passed along to the ANQP server, which responds with an updated common ANQP group, including the updated ANQP attributes. The updated common ANQP group is then relayed to the querying station.

In other embodiments, station 200 is configured to gain access to a network through another station configured as an AP. In such an embodiment, network interface 220 uses the common ANQP group in common ANQP group data structure 212 to carry out wireless communication with and through the AP. Network interface 220 is also operable to occasionally receive a message containing a new common ANQP group version. Processor 230 is configured to compare the new common ANQP group version with common ANQP group version 214. When the new common ANQP group version and common ANQP group version 214 match, processor 230 is configured to cause network interface 220 to continue using the common ANQP group in common ANQP group data structure 212 to carry out wireless communication. When the new common ANQP group version and common ANQP group version 214 do not match, or differ, processor 230 is configured to cause an ANQP query to be transmitted through network interface 220 to another station configured as an AP. Network interface 220 is also configured to receive an ANQP response message containing a new common ANQP group. Processor 230 is configured to cause the new common ANQP group to be stored in common ANQP group data structure 212 in memory 210. Processor 230 is further configured to cause network interface 220 to use the new common ANQP group to carry out further wireless communication.

Figure 3:
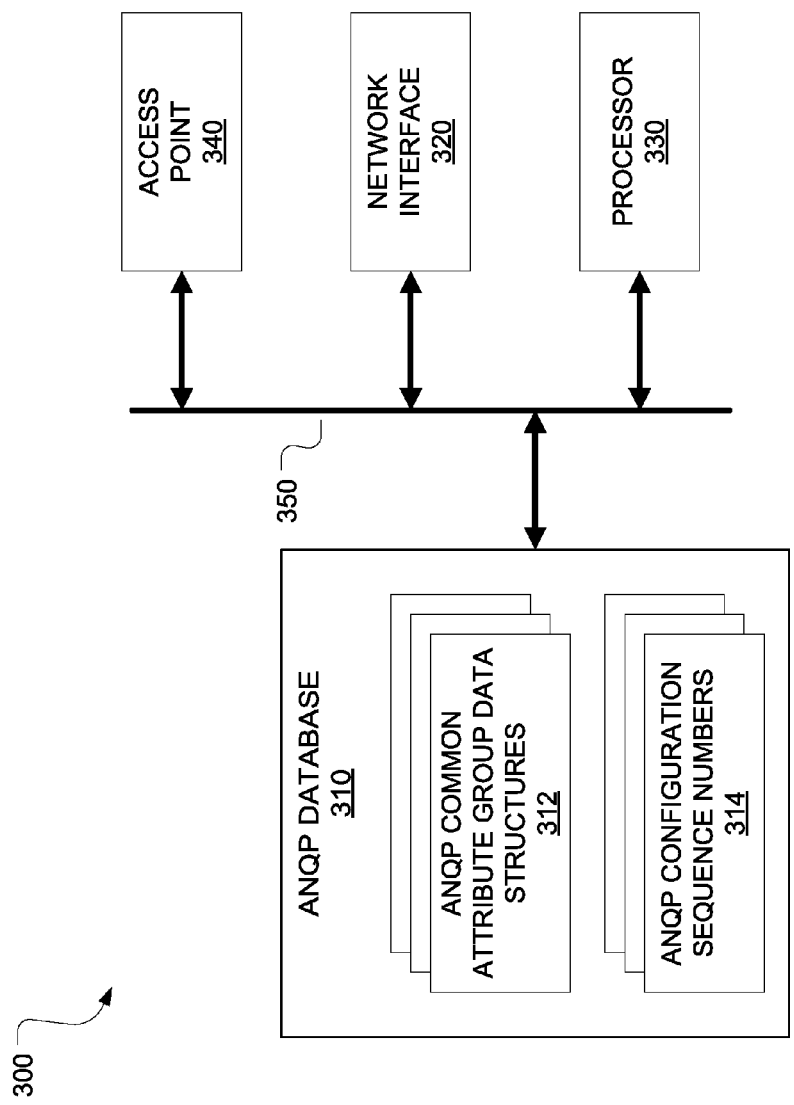
FIG. 3 is a block diagram of one embodiment of an ANQP server.

FIG. 3 is a block diagram of one embodiment of an ANQP server 300. ANQP server 300 includes an ANQP database 310, a network interface 320, a processor 330, and an access point 340, each coupled to a data bus 350. Data bus 350 can be any electrical interface over which processor 330 and network interface 320 can gain access to ANQP database 310 and communicate between each other. For example, in certain embodiments, data bus 350 is one or more cables connecting ANQP database 310, network interface 320, and processor 330. Data bus 350 can be a parallel bus, such as peripheral component interconnect (PCI) and small computer system interface (SCSI), among others. In other embodiments, data bus 350 is a serial bus, such as serial advanced technology attachment (SATA) and universal serial bus (USB), among others.

Network interface 320 is responsible for transmitting and receiving data over one or more wired communication channels. Network interface 320 provides ANQP server 300 with access to a network. Access point 340 provides wireless access to the network for one or more stations. Access point 340 operates according to a protocol for a given wireless communication channel. For example, in a Wi-Fi system, access point 340 is configured to carry out wireless communication according to IEEE 802.11. Data received through access point 340 is relayed to the network through network interface 320.

Processor 330 is operable to execute an ANQP server application, thereby generating instructions for network interface 320, access point 340, and other subsystems on ANQP server 300. While executing on processor 330, the ANQP server application generates ANQP attributes for use in a BSS or ESS by one or more access points and one or more stations. One or more common ANQP groups are maintained in common ANQP group data structures 312 in ANQP database 310. Each of the common ANQP groups in common ANQP group data structures 312 are associated with respective common ANQP group versions 314. When processor 330 updates an ANQP attribute in one of common ANQP group data structures 312 while executing the ANQP server application, a new common ANQP group version is associated with the one common ANQP group and cached in ANQP database 310 in common ANQP group versions 314.

Access point 340 is configured to gain access to a common ANQP group in ANQP database 310 for use in providing wireless access to the network. The common ANQP group and associated common ANQP group version for access point 340 is relayed by access point 340 to various stations associated with or that query access point 340. When ANQP queries are received by access point 340 from various stations, the ANQP queries are relayed to the ANQP server application executing on processor 330. Processor 330 then gains access to ANQP database 310 and retrieves the appropriate common ANQP group from common ANQP group data structures 312. An ANQP response message is generated by processor 330 and relayed to the various stations through access point 340.

Figure 4:
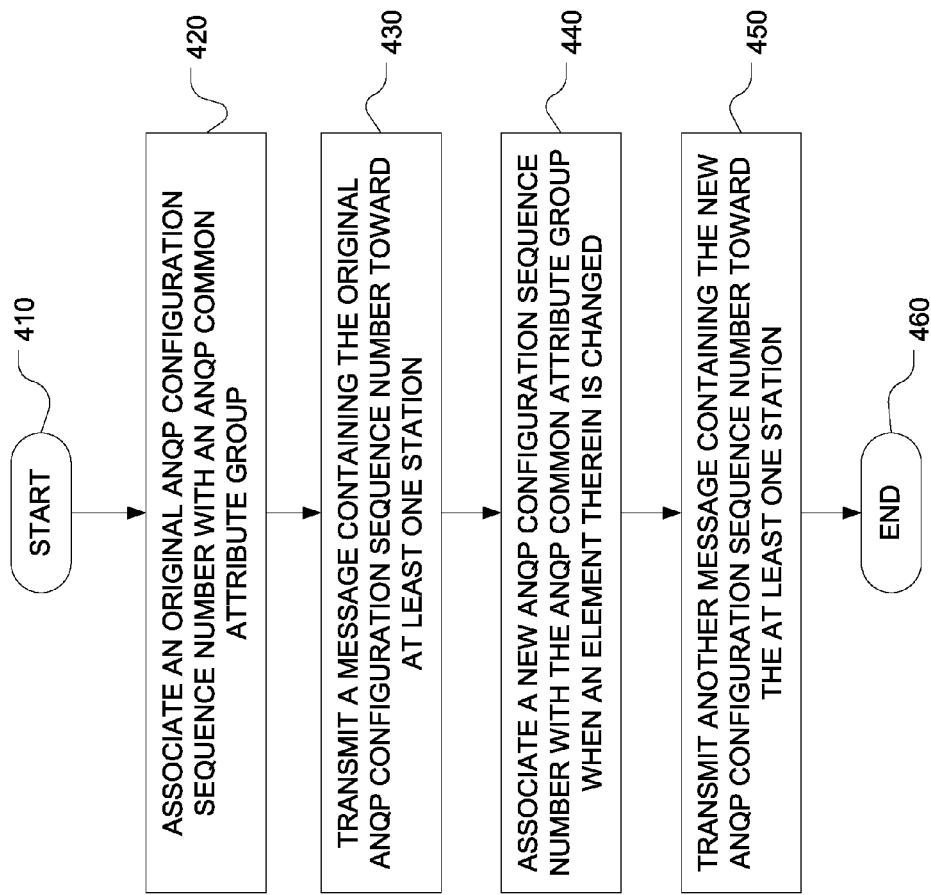
FIG. 4 is a flow diagram of one embodiment of a method of versioning a common ANQP group.

FIG. 4 is a flow diagram of one embodiment of a method of versioning a common ANQP group. The method begins at a start step 410. At a first association step 420, an original common ANQP group version is associated with a common ANQP group. In some embodiments, associating the common ANQP group version is carried out by an ANQP server. The common ANQP group contains ANQP attributes that provide ANQP attributes necessary for carrying out wireless communication through the AP and over a network. A message is transmitted at a first transmission step 430 to at least one station. The message contains the original common ANQP group version. In certain embodiments, either in the message with the common ANQP group version or in an independent message, the common ANQP group is transmitted to the at least one station for use in wireless communication through the AP.

At a second association step 440, a new common ANQP group version is associated with the common ANQP group when at least one ANQP attribute therein is changed. The new common ANQP group version is distinct from the original ANQP and is also associated by the AP. The new common ANQP group version indicates the common ANQP group has changed. The new common ANQP group version is transmitted to the at least one station at a second transmission step 450.

In certain embodiments, an ANQP query is received after second transmission step 450. The ANQP query is in response to the new common ANQP group version. The AP then responds to the received ANQP query with another transmission containing the updated common ANQP group. The method ends at a step 460.

Figure 5:
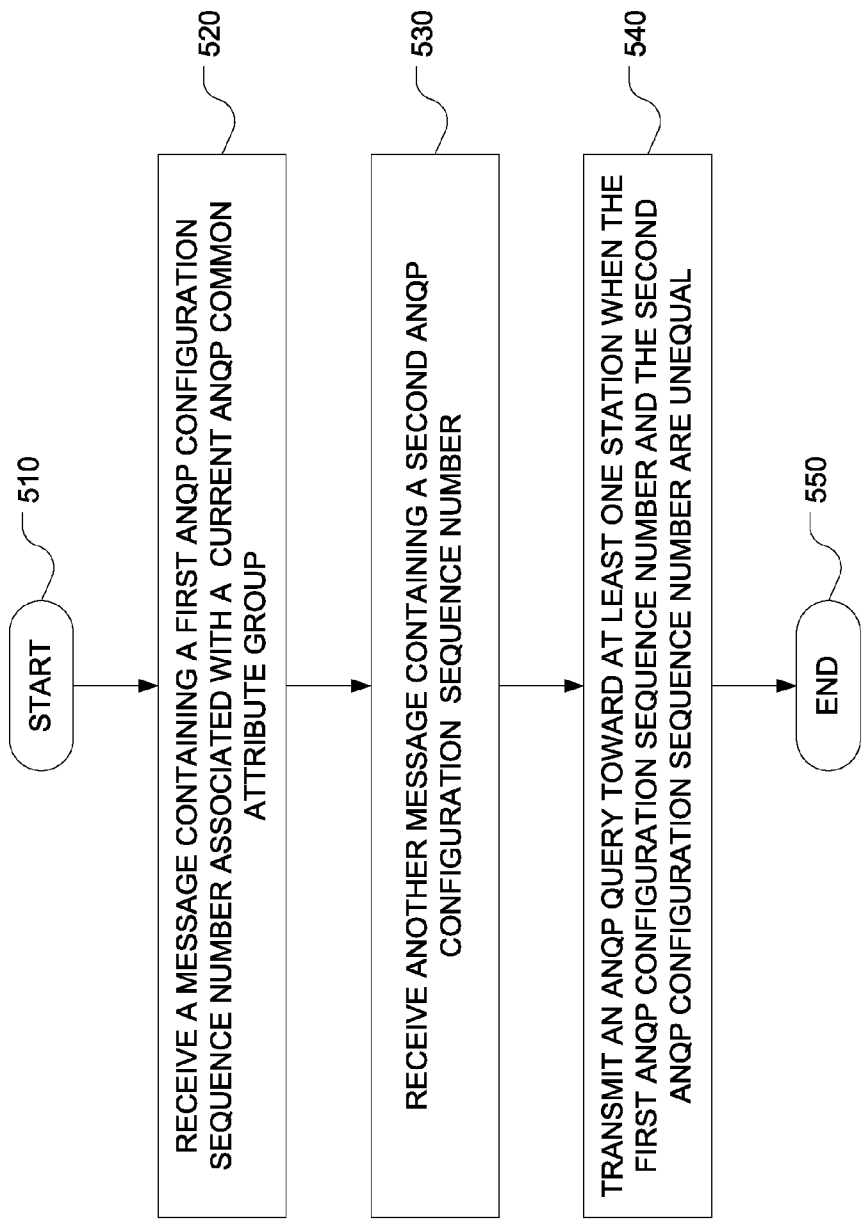
FIG. 5 is a flow diagram of one embodiment of a method of ANQP querying.

FIG. 5 is a flow diagram of one embodiment of a method of ANQP querying. ANQP querying is generally carried out by a station and is typically directed to another station, such as an AP. The method begins at a start step 510. At a first receipt step 520, a message is received containing a first common ANQP group version associated with a current common ANQP group. The current common ANQP group is used for carrying out wireless communication through an AP.

At a second receipt step 530, another message is received containing a second common ANQP group version. The station compares the first common ANQP group version and the second common ANQP group version. When the second common ANQP group version matches the first common ANQP group version, the station continues using the current common ANQP group for carrying out wireless communication through the AP. When the second common ANQP group version is distinct, or differs, with respect to the first common ANQP group version, it indicates the current common ANQP group is no longer current, and an update is needed. The station then transmits an ANQP query to at least one station to discover a new common ANQP group at a querying step 540. In an additional embodiment, the method includes receiving a third message containing the current common ANQP group before receiving the another message.

In certain embodiments, the station then receives an ANQP response message containing the new common ANQP group. The station then uses the new ANQP attributes and ANQP attributes to carry out further wireless communication through the AP. The method ends at a step 550.

Figure 6:
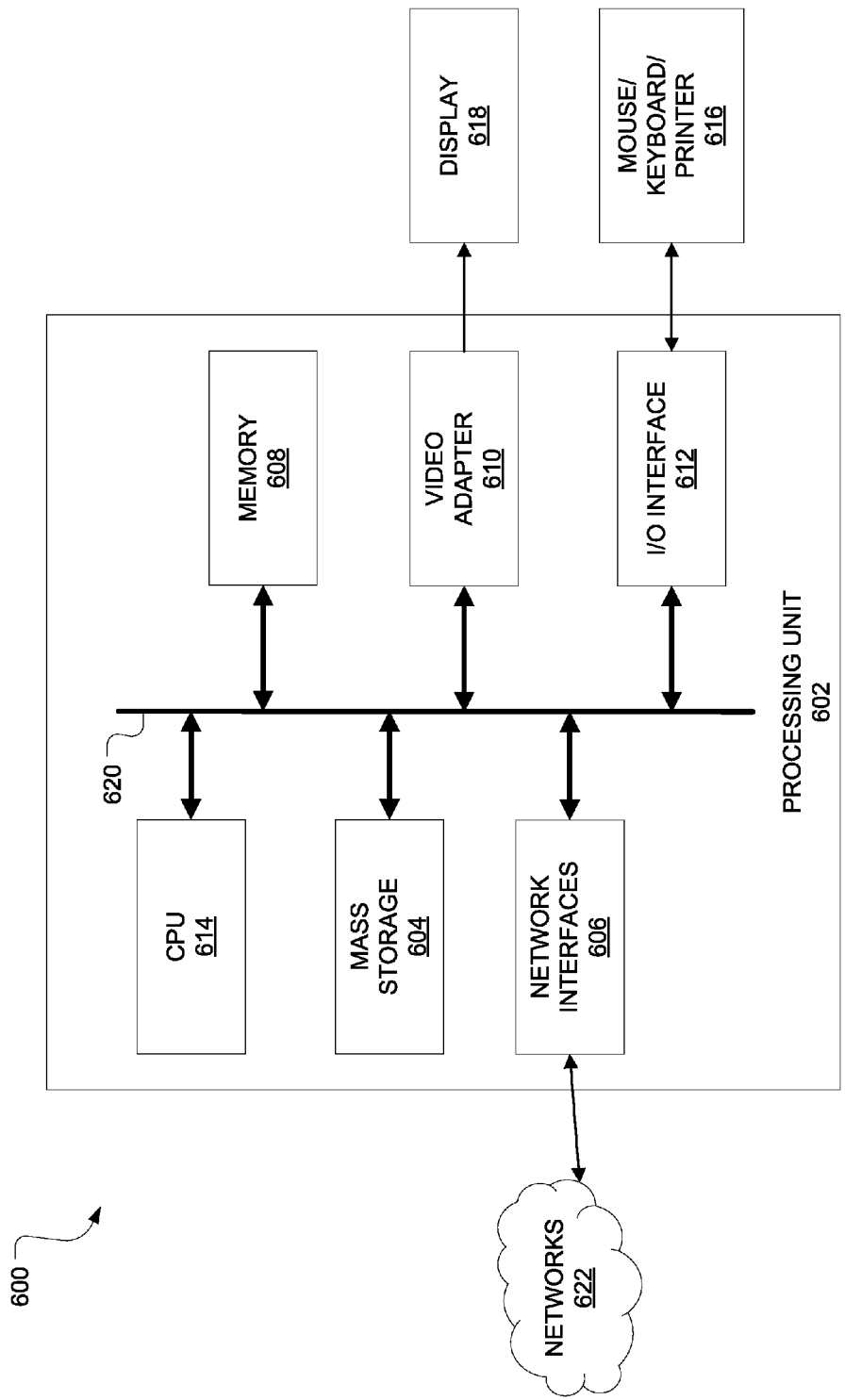
FIG. 6 is a block diagram of a processing system.

FIG. 6 is a block diagram of a processing system 600 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 600 may comprise a processing unit 602 equipped with one or more input/output devices, such as a speaker, microphone, mouse, touchscreen, keypad, keyboard, printer, display, and the like. The processing unit may include a central processing unit (CPU) 614, memory 608, a mass storage device 604, a video adapter 610, and an I/O interface 612 connected to a bus 620.

The bus 620 may be one or more of any type of several bus architectures including a memory bus or memory controller, a peripheral bus, video bus, or the like. The CPU 614 may comprise any type of electronic data processor. The memory 608 may comprise any type of system memory such as static random access memory (SRAM), dynamic random access memory (DRAM), synchronous DRAM (SDRAM), read-only memory (ROM), a combination thereof, or the like. In an embodiment, the memory 608 may include ROM for use at boot-up, and DRAM for program and data storage for use while executing programs.

The mass storage 604 may comprise any type of storage device configured to store data, programs, and other information and to make the data, programs, and other information accessible via the bus 620. The mass storage 604 may comprise, for example, one or more of a solid state drive, hard disk drive, a magnetic disk drive, an optical disk drive, or the like.

The video adapter 610 and the I/O interface 612 provide interfaces to couple external input and output devices to the processing unit 602. As illustrated, examples of input and output devices include a display 618 coupled to the video adapter 610 and a mouse/keyboard/printer 616 coupled to the I/O interface 612. Other devices may be coupled to the processing unit 602, and additional or fewer interface cards may be utilized. For example, a serial interface such as Universal Serial Bus (USB) (not shown) may be used to provide an interface for a printer.

The processing unit 602 also includes one or more network interfaces 606, which may comprise wired links, such as an Ethernet cable or the like, and/or wireless links to access nodes or different networks. The network interfaces 606 allow the processing unit 602 to communicate with remote units via the networks. For example, the network interfaces 606 may provide wireless communication via one or more transmitters/transmit antennas and one or more receivers/receive antennas. In an embodiment, the processing unit 602 is coupled to a local-area network 622 or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of versioning a common access network query protocol (ANQP) group, the method comprising:
    associating, by an access point, an original common ANQP group version with the common ANQP group, the common ANQP group comprising a plurality of ANQP elements, each ANQP element including an ANQP element identifier (ID) and an associated ANQP element value;
    transmitting, by the access point, a first message containing the original common ANQP group version to at least one station;
    associating, by the access point, a new common ANQP group version with the common ANQP group, in response to a change in a composition of the ANQP element IDs in the common ANQP group; and
    transmitting, by the access point, another message containing the new common ANQP group version to the at least one station.

2. The method of claim 1, further comprising receiving an ANQP query from the at least one station after the transmitting the another message.

3. The method of claim 1, wherein the transmitting the first message includes transmitting a beacon message.

4. The method of claim 1, wherein the transmitting the first message includes transmitting a probe response message.

5. The method of claim 1, wherein the new common ANQP group version also represents that a value of another ANQP element in the common ANQP group has changed.

6. A method of access network query protocol (ANQP) querying, comprising:
    receiving, by a station, a message containing a first common ANQP group version associated with a current common ANQP group comprising a plurality of ANQP elements, each ANQP element including an ANQP element identifier (ID) and an associated ANQP element value;
    receiving, by the station, another message containing a second common ANQP group version indicating a change in a composition of the ANQP element IDs in the current common ANQP group; and
    transmitting, by the station, an ANQP query to at least one access point.

7. The method of claim 6, further comprising receiving a third message containing the current common ANQP group before the receiving of the another message.

8. The method of claim 6, further comprising receiving a response message associated with the ANQP query, wherein the response message includes a new common ANQP group.

9. The method of claim 8, further comprising employing the new common ANQP group in carrying out wireless communication.

10. The method of claim 6, further comprising storing the first common ANQP group version in a memory.

11. The method of claim 10, further comprising storing the ANQP element IDs and the associated values of the current common ANQP group.

12. The method of claim 11, further comprising comparing the first common ANQP group version in the memory to the second common ANQP group version.

13. The method of claim 7, further comprising transmitting a probe message to which the message containing the first common ANQP group version is a response.

14. The method of claim 7, wherein the second common ANQP group version also represents that a value of another ANQP element in the current common ANQP group has changed.

15. An access network query protocol (ANQP) server, comprising:
    a memory configured to store a common ANQP group according to a common ANQP group data structure comprising a plurality of ANQP elements, each ANQP element including an ANQP element identifier (ID) and an associated ANQP element value;
    a network interface configured to transmit the common ANQP group and a common ANQP group version associated therewith to at least one station; and
    a processor configured to cause a change in a composition of the ANQP element IDs in the common ANQP group, and cause, in response thereto, a new common ANQP group version to be transmitted to the at least one station.

16. The ANQP server of claim 15, wherein the network interface is further configured to transmit the common ANQP group when an ANQP query is received.

17. The ANQP server of claim 15, wherein the plurality of ANQP elements include a domain name.

18. The ANQP server of claim 15, further comprising an access point (AP) operable to employ the common ANQP group to provide access to a network for the at least one station.

19. The ANQP server of claim 18, wherein the network interface is further configured to transmit the common ANQP group and the common ANQP group version to the at least one station through the AP.

20. The ANQP server of claim 19, wherein the AP is configured to transmit the new common ANQP group version in a beacon message.

21. The ANQP server of claim 15, wherein the network interface is configured to employ a generic advertisement service (GAS) protocol to transmit the common ANQP group and common ANQP group version.

22. The ANQP server of claim 15, wherein the plurality of ANQP elements correspond to at least two access points (APs) that share a service set identifier (SSID).

23. The ANQP server of claim 15, wherein the plurality of ANQP elements correspond to at least two access points (APs) that share a basic service set identifier (BSSID).

24. The ANQP server of claim 15, wherein the plurality of ANQP elements correspond to at least two access points (APs) that share a homogeneous extended service set identifier (HESSID).

25. A station, comprising:
    a memory configured to store:
        a common access network query protocol (ANQP) group comprising a plurality of ANQP elements, each ANQP element including an ANQP element identifier (ID) and an associated ANQP element value, according to a common ANQP group data structure, and a common ANQP group version associated with the common ANQP group;

a network interface operable to employ the common ANQP group for carrying out wireless communication, and receive another common ANQP group version indicating a change in a composition of the ANQP element IDs in the common ANQP group; and a processor configured to cause the network interface to transmit an ANQP query message to an ANQP server in response to the common ANQP group version and the another common ANQP group version being different.

26. The station of claim 25, wherein the processor is further configured to cause the another common ANQP group version to be stored in the memory in response to the common ANQP group version and the another common ANQP group version being different.

27. The station of claim 25, wherein the another common ANQP group version also represents that a value of another ANQP element in the common ANQP group has changed.

28. The station of claim 25, wherein the network interface is further operable to receive an ANQP response containing a new common ANQP group employable therein for further wireless communication and associated with the another common ANQP group version.

29. The station of claim 28, wherein the processor is further configured to cause the new common ANQP group to be stored in the common ANQP group data structure.

30. The station of claim 25, wherein the network interface is configured to employ IEEE 802.11 standards to carry out the wireless communication over a wireless network.

31. The station of claim 25, wherein the memory is further configured to store a basic service set identifier (BSSID) value that corresponds to the common ANQP group.

32. The station of claim 25, wherein the memory is further configured to store a service set identifier (SSID) value that corresponds to the common ANQP group.

33. The station of claim 25, wherein the memory is further configured to store a homogeneous extended service set identifier (HESSID) value that corresponds to the common ANQP group.

34. The ANQP server of claim 15, further comprising the processor configured to cause an updated value to be stored in one of the plurality of ANQP element in the common ANQP group.

* * * * *